United States Patent [19]

Boggs

[11] 3,975,094
[45] Aug. 17, 1976

[54] APPARATUS FOR COMPOSING COMPOSITE ILLUSTRATIONS

[76] Inventor: William O. Boggs, 1333 N. Robberson, Springfield, Mo. 65802

[22] Filed: Apr. 24, 1975

[21] Appl. No.: 571,058

[52] U.S. Cl. ................................ 353/35; 35/28
[51] Int. Cl.² .............................. G03B 21/26
[58] Field of Search ....................... 353/30–37, 353/26 R, 26 A; 242/68.1, 71.1, 71.6; 35/28, 76; 40/86 A, 95

[56] References Cited
UNITED STATES PATENTS

| | | | |
|---|---|---|---|
| 2,063,330 | 12/1936 | Nagel | 242/71.6 |
| 2,813,457 | 11/1957 | Fitzgerald | 353/35 |
| 3,319,550 | 5/1967 | Broche | 242/71.6 |
| 3,336,681 | 8/1967 | Minasy | 353/26 R |
| 3,597,070 | 8/1971 | Slettebo | 353/26 R |
| 3,687,536 | 8/1972 | Gorrell | 353/35 |

*Primary Examiner*—Harry N. Haroian
*Attorney, Agent, or Firm*—Gravely, Lieder & Woodruff

[57] ABSTRACT

An apparatus for composing composite illustrations includes a plurality of film strips having successive frames, each of which possesses a separate illustration, a registration mark, and a number identifying the frame. All of the film strips pass through a gate where they are superimposed on each other. One side of the gate is a light transmitting material which is illuminated by a light source. The other side of the gate is a transparent window having a separate registration mark for each film strip. When the registration marks on selected frames of the several film strips are aligned with their appropriate registration marks on the window, a composite illustration is formed and this illustration is visible through the window. The composite illustration may be altered by moving one or more of the film strips to bring other frames thereof into the proper position within the gate, that is, with the frame registration mark aligned with the appropriate window registration mark. For some film strips, several registration marks are provided on the window, to provide slight variations in the positions of the illustrations on the film strip with regard to the overall composite. Beyond each end of the gate the film strips are wound around separate spools which are rotated by a single advancing knob. A clutch mechanism is associated with each spool for connecting it with the advancing knob so that the film strips may be advanced in either direction individually. The apparatus is particularly useful in constructing composite portraits, in which case the illustrations on the film strips depict facial features with each film strip being devoted to variations of the same facial feature.

22 Claims, 10 Drawing Figures

APPARATUS FOR COMPOSING COMPOSITE ILLUSTRATIONS

BACKGROUND OF THE INVENTION

This invention relates in general to an illustrating apparatus, and more particularly to an apparatus for composing composite illustrations.

One of the many procedures available to law enforcement agencies for apprehending criminals is making a portrait of the criminal and circulating that portrait among law enforcement officers or even to the public by means of a newspaper. In order to prepare such a portrait, an artist, who has never seen the criminal, must confer with witnesses to the crime and from such discussions must attempt to develop a likeness of the criminal. Since this is a time consuming process, it affords the criminal ample time to escape and even change his appearance. Due to the difficulties of constructing a portrait, the procedure is reserved for only the most serious crimes.

A somewhat simpler procedure is available which enables law enforcement agencies to construct a composite portrait by using a series of overlays. These overlays are derived from a kit containing many overlays for each facial feature. Police personnel work with witnesses until the correct combination of overlays is determined. These kits are quite expensive and as a result each law enforcement agency has only a few at the most. Moreover, they require considerable time on the part of law enforcement personnel and witnesses in the construction of the composite, and once the composite is constructed there is no quick way to disseminate it to law enforcement personnel who are in the field looking for the criminal.

SUMMARY OF THE INVENTION

One of the principal objects of the present invention is to provide an apparatus for rapidly constructing composite illustrations. Another object is to provide an apparatus of the type stated which provides means for designating or identifying each illustration so constructed in such a manner that the designation is easily disseminated to other individuals possessing apparatus of that nature. A further object is to provide an apparatus of the type stated which is ideally suited for constructing portraits of criminals at the scene of a crime while the criminals facial features are still fresh in the minds of witnesses. An additional object is to provide an apparatus of the type stated which is simple in construction, inexpensive to manufacture, easy to operate, and highly compact. Still another object is to provide a system for constructing a composite portrait of a criminal and rapidly disseminating information which enables others to quickly reproduce the portrait. These and other objects and advantages will become apparent hereinafter.

The present invention is embodied in an apparatus including a gate and a plurality of transparencies which extend through the gate where they are superimposed. The transparencies have illustrations thereon and those illustrations which are located in the gate form the composite. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur.

DETAILED DESCRIPTION

Figure 1:
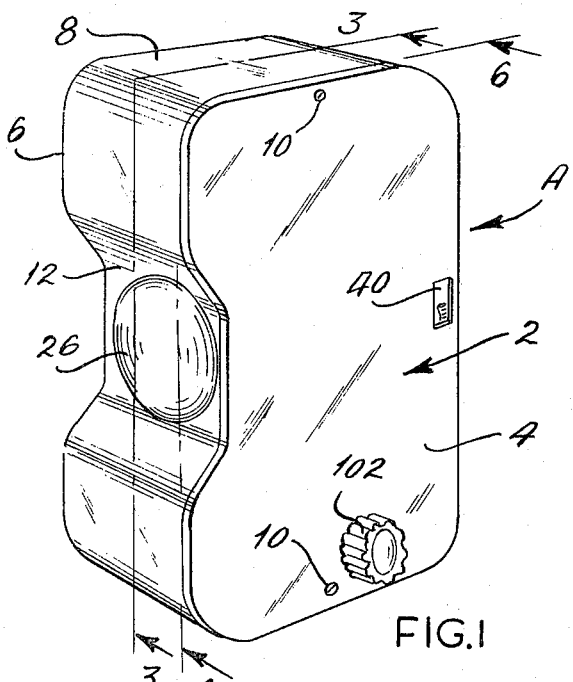
FIG. 1 is a perspective view of the illustrative apparatus of the present invention showing primarily the right side thereof.
Figure 2:
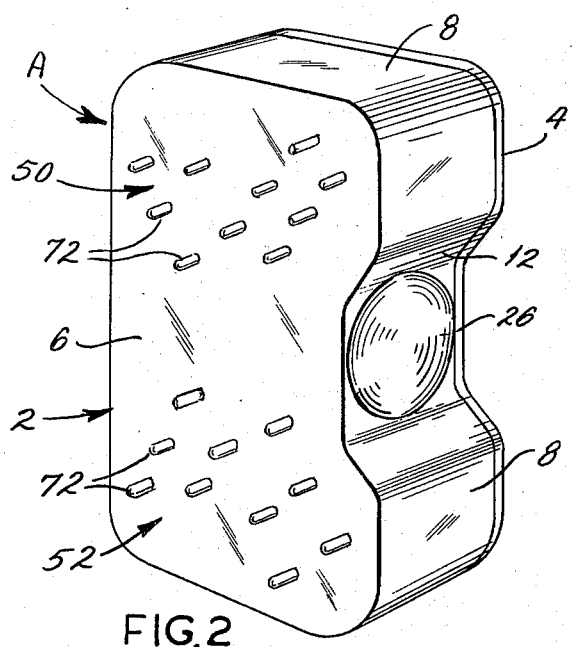
FIG. 2 is a perspective view showing primarily the left side.

Referring now to the drawings (FIGS. 1 and 2), A designates an illustrative apparatus for composing a composite portrait of an individual from separate illustrations of facial features, with each facial feature being identified as to its appearance and location by numerals and letters so that all of the facial features which make up the portrait can be disseminated to others having the apparatus A. Those other individuals may compose the portrait on their illustrative apparatus A so that the portrait is available to others within minutes after it is composed. The apparatus A is highly compact and generally rectangular in configuration, measuring about 5 × 9 × 2½ inches. It is easily stored in the glove compartment of an automobile, and may be carried in a coat pocket.

The identification apparatus A includes (FIGS. 1 and 2) a case 2 having a pair of parallel sidewalls 4 and 6 separated at their peripheral margins by a peripheral wall 8. The sidewall 6, which is on the left side of the case 2, is formed integral with the peripheral wall 8 or is at least permanently attached to it. The sidewall 4 which is on the right side of the case, is detachable from the peripheral wall 8, being secured in place by screws 10 which thread into the peripheral wall 8. Along one of its sides, the peripheral wall 8 has a viewing recess 12 and a viewing aperture 14 (FIG. 3) centered in that recess.

Extending inwardly from the peripheral wall 8 at the recess 12 are a pair of interior walls 16 (FIG. 3) which converge toward the center of the case 2 and terminate at rounded guide shoulders 18. The two walls 16 together with the sidewalls 4 and 6 define a viewing channel 20 having an optical axis X. The shoulders 18 have slots 22 therein which are oblique to the optical axis X of the viewing channel 20, and these slots receive the ends of a transparent plate or window 24 which extends across and forms the end of the viewing channel 20. While the ends of the window 24 which fit into the slots 22 are oblique to accommodate the angular disposition of the slots 22, the portion of the window 24 which extends across the end of the viewing channel 20 is perfectly flat and perpendicular to the optical axis X. The window 24 is preferably formed from a clear plastic, but may also be formed from glass.

The outer end of the viewing channel 20 is closed by a lens 26 (FIG. 3) which is received in the aperture 14 of the recess 12. The lens 26, which may be formed from plastic or glass, is configured to enlarge images or markings appearing at the window 24 or slightly beyond it and to bring these images or markings sharply into focus for an eye located close to the lens 26 and sighting through the lens 26 along the optical axis X.

Directly to the rear of the two rounded guide shoulders 18 are two more rounded guide shoulders 28 (FIG. 3), and these shoulders 28 merge into a flat diffusing screen 30 which is parallel to but spaced rearwardly from the flat window 24. The screen 30 is also preferably formed from plastic, but is translucent instead of transparent. The space between the window 24 and the diffusing screen 30 constitutes a gate 32 which is wide enough to accommodate about 10 strips of standard 35 mm film superimposed on one another. The rounded shoulders 18 and 28 have their ends flush with those surfaces of the window 24 and screen 30, respectively, which form the surfaces of the gate 32 so that a gentle convergence of surfaces exists at the two entrances to the gate 32.

Extended rearwardly from the back side of the diffusing screen 30 is a tapered reflector 34 (FIG. 3) which is attached to the shoulders 28 at its forward end and to the sidewall 6 at its rear end. The rear end of the reflector 34 carries a bulb socket 36 which holds a bulb 38 such that the filament for the bulb is located within the reflector 34 and presented toward the diffusing screen 30. The bulb 38 is connected through a switch 40 (FIG. 1) to a battery 42 which is located within the case 2, being retained in place on the sidewall 6 by battery clips 44.

Figure 3:
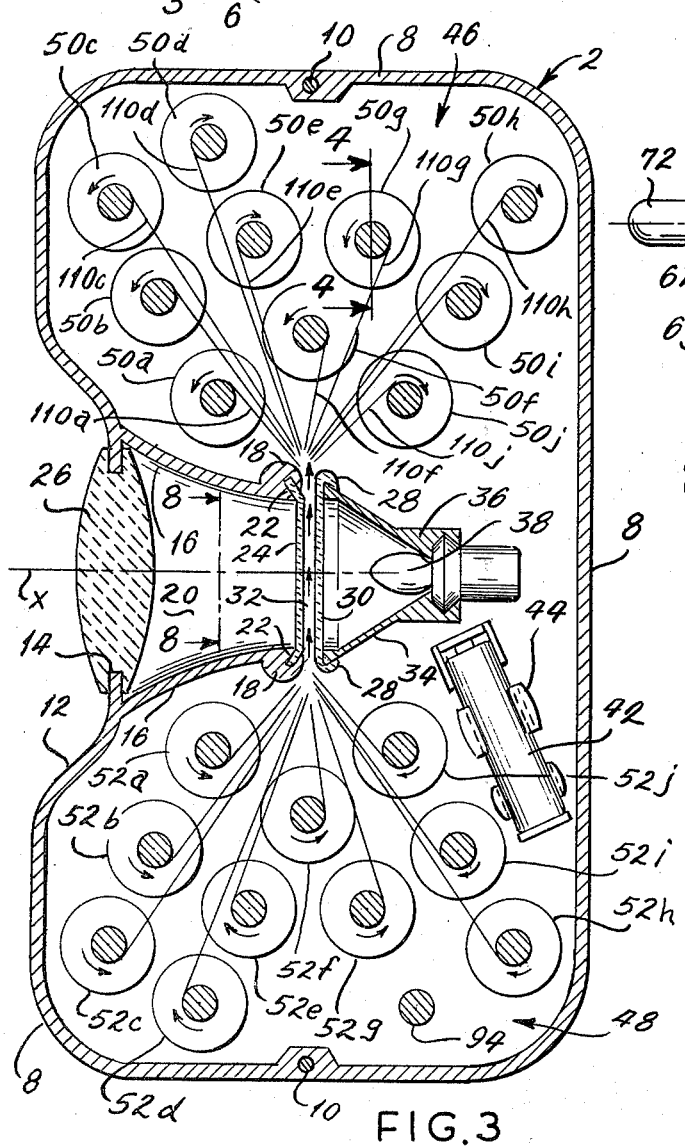
FIG. 3 is a sectional view taken along line 3—3 of FIG. 1 and showing the interior of the illustrative device midway between the sides of its case.

The converging interior walls 16, which define the viewing channel 20, together with the reflector 34 and bulb socket 36 divide the interior of the case 2 into upper and lower spool cavities 46 and 48 (FIG. 3). The gate 32 opens into the spool cavities 46 and 48 at the converging entrances formed by the rounded guide shoulders 18 and 28.

Figure 4:
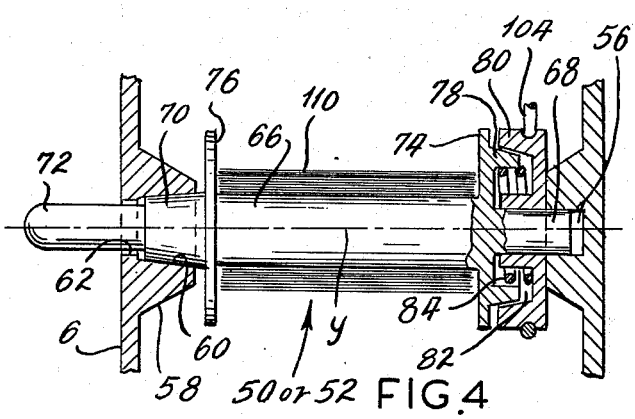
FIG. 4 is a sectional view taken along line 4—4 of FIG. 3 and showing one of the film strip spools.

The upper spool cavity 46 contains (FIG. 3) ten upper spool assemblies 50, a, b, c, d, e, f, g, h, i, and j, while the lower spool cavity 48 contains ten corresponding lower spool assemblies 52, a, b, c, d, e, f, g, h, i, and j. The arrangement of the spool assemblies 50 and 52 is symmetrical about the optical axis X. In particular, the spool assembly 50f is located directly above the gate 32, while the spool assembly 52f is located directly below the gate 32. The spool assemblies 50a, b, and c lie in a line to the front of the spool assembly 50f and the spool assemblies 52a, b, and c lie in a line directly ahead of the spool assembly 52f. These lines lead generally to the entrances to the gate 32. The spool assemblies 50h, i and j also lie in a line which leads to the upper entrance of the gate 32, but is located behind the gate 32, whereas the spool assemblies 52h, i, and j lie in a line which leads to the lower entrance to the gate 32, but is also located behind the gate 32. The spool assemblies 50 d, and e are located in that order above and slightly ahead of the spool assembly 50f, while the corresponding spool assemblies 52 d, and e are located in that order below and slightly ahead of the spool assembly 52f. Indeed, the spool assemblies 50 d, e, and f lie in a line which leads generally to the upper entrance to the gate whereas the lower spool assemblies 52 d, e, and f lie in a line which leads generally to the lower entrance to the gate 32. The spool assembly 50g lies directly behind the spool assembly 50e, while the spool assembly 52g is behind the spool assembly 52e. The spool assemblies 50 and 52 are identical, except for location, and each possesses an axis of rotation y (FIG. 4). The axes of rotation y for the twenty spool assemblies 50 and 52 are parallel and perpendicular to the sidewalls 4 and 6 of the case 2.

Since the 20 spool assemblies 50 and 52 are identical, only 1 spool assembly 50 will be described in detail. At the spool assembly 50 the sidewall 4 of the case 2 has a tapered boss 54 (FIG. 4) which extends inwardly and is provided with an inwardly opening bore 56. Directly across the upper cavity 46, the sidewall 6 has another tapered boss 58 provided with a tapered socket 60 which opens inwardly and a reduced bore 62 which opens outwardly. The bore 56, the socket 60, and the bore 62 are all coaxial, with the common axis being the axis of rotation y for the spool assembly 50.

The spool assembly 50 includes (FIG. 4) a spool 66 which at one end merges into a cylindrical journal 68 and at its other end into a tapered braking portion 70. The journal 68 fits into the bore 56 on the sidewall 4, within which it will rotate. The tapered braking portion 70 fits into the tapered socket 60, with the taper of the two being the same in terms of the angle with the axis y. The tapered braking portion 70 in turn merges into a cylindrical end portion 72 which extends through the bore 62 in the wall 6 and terminates somewhat beyond the outer face of the wall 6. The end portion 72 forms a journal for the other end of the spool 66.

The spool 66 further includes a pair of spaced apart flanges 74 and 76. The flange 74 is located adjacent to the journal 68, while the flange 76 is located adjacent to the tapered braking portion 70. The spacing between the two flanges 74 and 76 is enough to accommodate a strip of 35 mm film with the flanges 74 and 76 guiding the strip as it rolls around the spool 66.

The flange 74 carries a clutch ring 78 which projects axially therefrom toward the boss 54 on the wall 4, and this ring has a tapered outside surface. The clutch ring 78 projects into a hollow spool pulley 80 which rotates on the journal 68 between the boss 54 and the flange 74. The pulley 80 has an annular cavity 82 which receives the clutch ring 78 and the surface of this cavity is tapered to conform with the taper of the outside surface of the clutch ring 78. The cavity 82 also contains a coil-type 84 compression spring which encircles the journal 68 and urges the pulley 80 toward the boss 54 on the wall 4 and the spool 66 in the direction of the wall 6. The pulley 80 contains a peripheral groove 86.

The spring 84 normally forces the tapered braking portion 70 of the spool 66 into contact with the walls of the tapered socket 60 in the boss 58 of the wall 6 (FIG. 4). When the spool 66 so disposed, the opposed tapered surfaces of the clutch ring 78 and the hollow pulley 80 are separated slightly. This is a braked or rest position for the spool 66, and in this position it will not turn easily even though the pulley 80 revolves. By pressing the end portion 72 of the spool 66 inwardly, the entire spool 66 is shifted axially against the force exerted by the spring 84. The movement, which is quite short, being on the order of 0.0156 inches, terminates when the tapered surface of the clutch ring 78 engages the tapered surface of the annular cavity 82 in the pulley 80. This is the drive position for the spool 66 and the spool 66 will rotate with the pulley 80.

Figure 5:
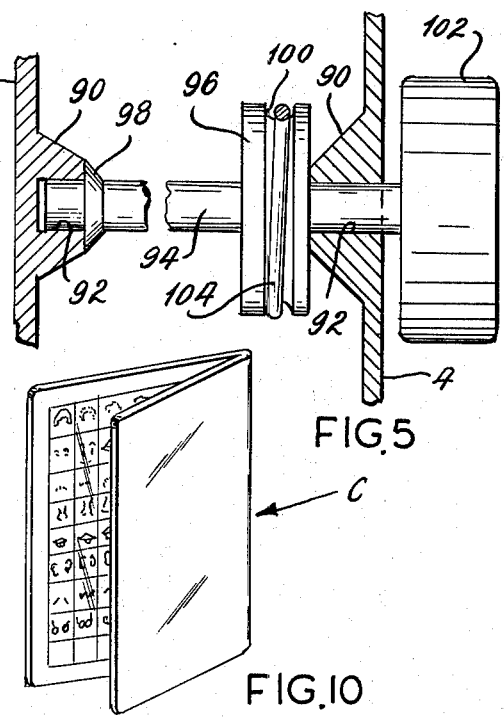
FIG. 5 is a sectional view taken along line 5—5 of FIG. 3 and showing the drive pulley and knob for rotating the spools.

Near the bottom of the case 2, the sidewalls 4 and 6 have opposed tapered bosses 90 (FIG. 5) which project into the lower spool cavity 48 and are provided with coaxial bores 92 through which a drive shaft 94 extends. The drive shaft is provided with a drive pulley 96 next to the boss 90 on the wall 4 and has a shoulder 98 located adjacent to the boss 90 on the wall 6. The pulley 96 has a peripheral groove 100. The shoulder 98 and pulley 96 are both fixed firmly to the shaft 94 and prevent axial movement of the shaft 94. The drive shaft 94 further projects beyond the wall 4 where it is provided with a hand knob 102 for rotating it.

Figure 6:
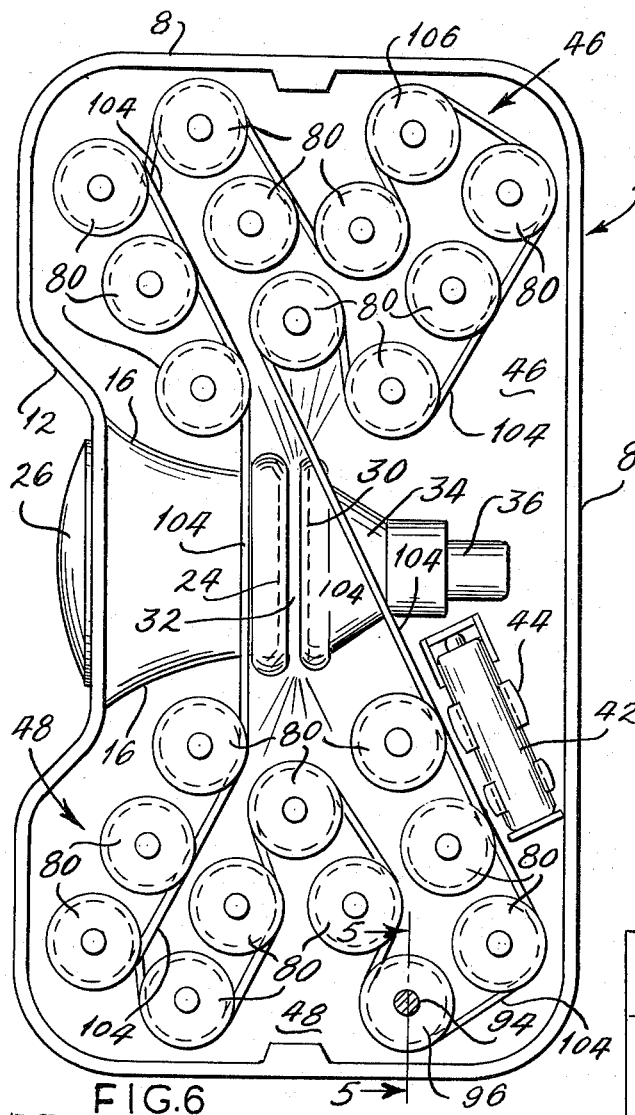
FIG. 6 is a sectional view taken along line 6—6 of FIG. 1 and showing the cable which connects the drive pulley with the spool pulleys so that the spool pulleys rotate in unison when the drive pulley is turned.

The drive pulley 96 on the drive shaft 94 is connected to the spool pulleys 80 of each of the drive assemblies 50 and 52 by a single endless cable 104 (FIG. 6) which winds around the drive pulley 96 in excess of 360° and is trained around each of the spool pulleys 80 for at least 90°. The path of the cable 104 is such that corresponding pulleys 80 in the upper and lower spool cavities 46 and 48 will rotate in unison and the same direction. For example, the pulley 80 of the spool assemblies 50*a* and 52*a* will both rotate either clockwise or counterclockwise, depending on the direction the knob 102 is turned. The cable 104 also passes around an idler pulley 106 which is located in the upper spool cavity 46. The idler pulley 106 is spring loaded so that it takes up slack in the cable 104 and maintains the cable 104 taut.

The spools 66 of corresponding spool assemblies 50 and 52 have 35 mm film strips 110 (FIG. 3) wound around them, and film strip 110 is permanently attached at its ends to the two spools 66 around which it is wound so that it will not come off of the spools 66 when unwound to either of its ends. Each film strip 110 passes through the gate 32. For example, a single film strip 110*a* is wound around the spool 66 of spool assembly 50*a* and also around the spool 66 of the spool assembly 52*a*. The portion of the film strip 110*a* which is not on either of the spools 66 passes through the gate 32. Indeed, all of the film strips 110 are superimposed within the gate 32 and diverge beyond the two entrances to the gate 32. The rounded shoulders 18 and 28 prevent the film strips 110 from bending sharply at the entrances to the gates, and the spool assemblies 50 and 52 are arranged such that no film strip 110 is inclined more than 30° with respect to the center plane of the gate 32.

To wind a film strip 110 on its spool 66 in the upper cavity 46, the end portion 72 of that spool 66 is pressed inwardly while the hand knob 102 is turned in the prescribed direction. This engages the friction clutch ring 78 on the spool 66 with the rotating pulley 80 for the spindle assembly 50 and causes the spool 66 to turn, thus winding the film strip 110 about it. The film strip 110, of course, pays out of the spool 66 in the lower cavity 48, and as it does the lower spool 66 rotates with slippage occurring between its tapered braking portion 70 and the tapered socket 60 within which that braking portion 70 fits. The film strip 110 is advanced in the opposite direction by pressing the end portion 72 of the corresponding lower spool 66 assembly inwardly and rotating the knob 102 in the opposite direction.

Figure 7:
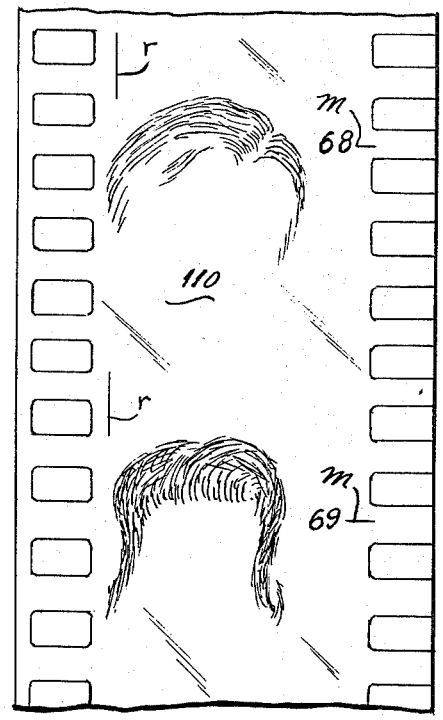
FIG. 7 is a fragmentary view of a typical film strip forming part of the present invention.

The film strips 110 have individual frames thereon with each frame being about the same size as the transparent window 24 in front of the gate 32 (FIG. 7). Each frame is numbered with the numbering on each strip 110 commencing at 0 and going as high as 80. While the location of the numbers on the frames of an individual strip 110 are the same, these number locations vary between the strips 110. Thus, the frame numbers on the film strip 110*g* are in the upper right portion of the frames, while the frame numbers for the strip 110*a* are in the lower right portions of the frames. Each frame number, irrespective of its location on the frame, is located next to a horizontal registration mark $m$.

Each film strip 110 is devoted to a particular facial feature in that the frames of that strip illustrate only variations of that facial feature. The facial features and the film strips 110 on which they are depicted are listed below:

| Facial Feature | Film Strip |
|---|---|
| beards, moustaches | 110a |
| glasses | 110b |
| nose | 110c |
| hair | 110d |
| lips | 110e |
| brow | 110f |
| eyes | 110g |
| headshape-chin | 110h |
| age lines, wrinkles | 110i |
| ears | 110j |

The film strips 110 are arranged in the foregoing order behind the window 24. Those frames on the film strips 110 which are designated by the numeral zero are blank and are used when a particular facial feature, such as a beard or eye glasses, is not in the portrait and also when it is desired to clear the window 24 of all images. The same scale is utilized with each film strip 110 so that noses will be in proportion to lips, eyes, and the like. Also, the lateral location of the features on one film strip 110 are in the correct relationship to features on other film strips 110. Thus, noses, and lips are generally centered with respect to eyes and ears. Since the film strips 110 are superimposed on one another within the gate 32, it is possible to construct a large number of composite portraits, but this requires precise positioning of the film strips 110 in the direction of the advance, that is, the vertical direction. For example, the film strip 110*e* containing noses, must be properly positioned in the vertical direction with respect to the film strip 110*d* containing hair so that the nose on any frame of the former will be located the proper distance below the hair on any frame of the latter.

Figure 8:
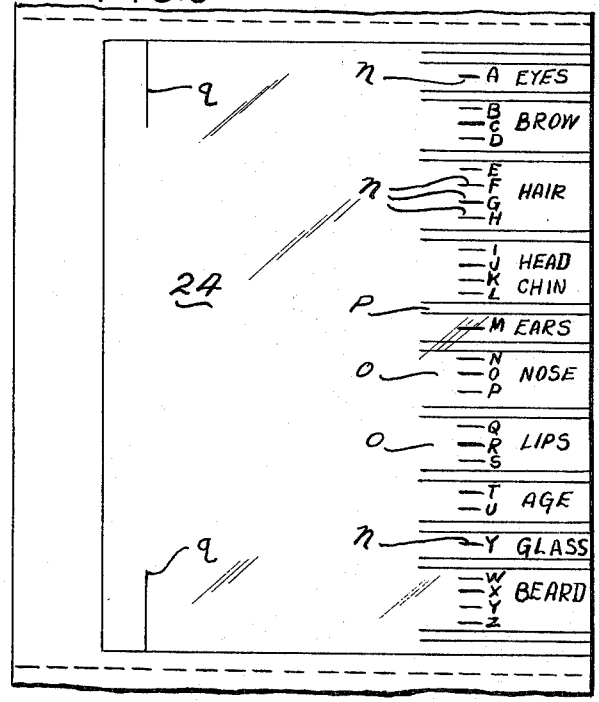
FIG. 8 is an elevational view of the window taken along line 8—8 of FIG. 3 and showing one side of the gate and the registration marks and letters thereon.

This precise positioning is achieved by aligning the registration marks $m$ (FIG. 7) on the film strips 110 with corresponding registration marks $n$ (FIG. 8) along the right side of the transparent window 24. Since the location of the film registration marks $m$ vary from one film strip 110 to another, at least one registration mark $n$ is provided on the window 24 for each film strip 110. Indeed, for most of the film strips 110 several registration marks $n$ are provided at closely spaced intervals in the vertical direction to compensate for variations in the vertical positioning of facial features amongst different individuals. The registration marks $n$ are designated by letters which are arranged in alphabetical order from the top of the window 24 to the bottom thereof. Moreover, the marks $m$ for each film strip 110 are contained within zones $o$ clearly delineated on the window 24 by horizontal markings $p$ of extended length and each zone $o$ bears the written designation as to which film strip 110 applies to it. For example, four vertically spaced registration marks $n$ designated by the letters E, F, G, and M and contained within a zone $o$ marked "hair" are used to locate frames on the film strip 110$d$ for hair. For an elongated face the registration mark $n$ on the hair frame which fits that face will most likely be aligned with one of the upper registration marks $n$ for hair such as the marks $n$ beside the letters E or F, since that will have the effect of raising the hair slightly and elongating the face. The chin may be dropped in a similar manner, that is, by using the lower chin marks $n$ designated by the letters k or L. No two zones $o$ have the same letters designating the registration marks in those zones $o$. The vertical relationship between some features, such as the ears and the eyes, do not vary significantly between different individuals, and hence only one registration mark $n$ is provided for the film strips 110 $g$ and $j$ containing these features. Where several registration marks $n$ are provided for a feature, one is made thicker than the others to indicate the most common or normal location of that feature.

The order in which the film strips 110 are arranged within the gate 32 gives some degree of perspective to the composite portrait which is formed.

On the other or left side of the window 24 vertical registration marks $q$ (FIG. 8) are provided while the frames of the film strips 110 have similar registration marks $r$ (FIG. 7). When the marks $r$ on the film strips 110 align with the marks $q$ on the window 24, the film strips 110 are correctly positioned insofar as the lateral direction is concerned. This lateral positioning is maintained by the flanges 74 and 76 on the spools 66. Thus, the noses on the film strip 110$c$ will be centered with respect to the eyes of the film strip 110$g$, etc.

OPERATION

The illustrative apparatus A is disigned for wide spread distribution throughout a law enforcement agency. Indeed, every law enforcement officer in the field should have the illustrative apparatus A readily at his disposal. The glove compartment of a police vehicle is a convenient place to carry the illustrative apparatus A.

Figure 10:
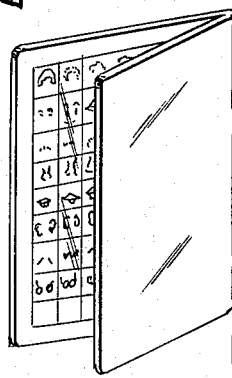
FIG. 10 is a perspective view of an identification chart used with the present invention.

Upon arriving at the scene of a crime committed by a criminal who has escaped, but has nevertheless been observed by a witness, the law enforcement officers may attempt to immediately construct a composite illustration of the criminal using the illustrative apparatus A. To do so, the law enforcement officer hands the witness a chart C (FIG. 10) showing all of the facial features illustrated on the film strips 110 of the apparatus A. The chart C has the facial features arranged in rows with like features being grouped together in the same row. For example, all of the eyes will be in one row and the lips in another row. Each facial feature on the chart C is assigned a number which is the same as the frame number for that facial feature on the pertinent film strip 110.

The witness selects the individual facial features which according to his recollection corresponds most closely to those of the criminal.

The police officer then dials the selected facial features into the apparatus A. More specifically, the police officer first energizes the bulb 38 by throwing the switch 40. This illuminates the diffusing screen 30 and the 10 superimposed film strips 110 in front of it. Then, while looking through the lens 26, he advances the film strips 110 by pressing the appropriate end portions 72 of the spools 66 inwardly and contemporaneously turning the hand knob 102 in the correct direction. The film strips 110 are advanced on an individual basis until the registration marks $m$ of the selected frames thereon align with the registration marks $n$ in the appropriate zones $o$ of the window 24. Where more than one registration mark $n$ is available in a zone $o$, the normal mark $n$, that is, the broadest, is used unless the witness specifically recalls that the feature pertaining to that zone is located differently.

Figure 9:
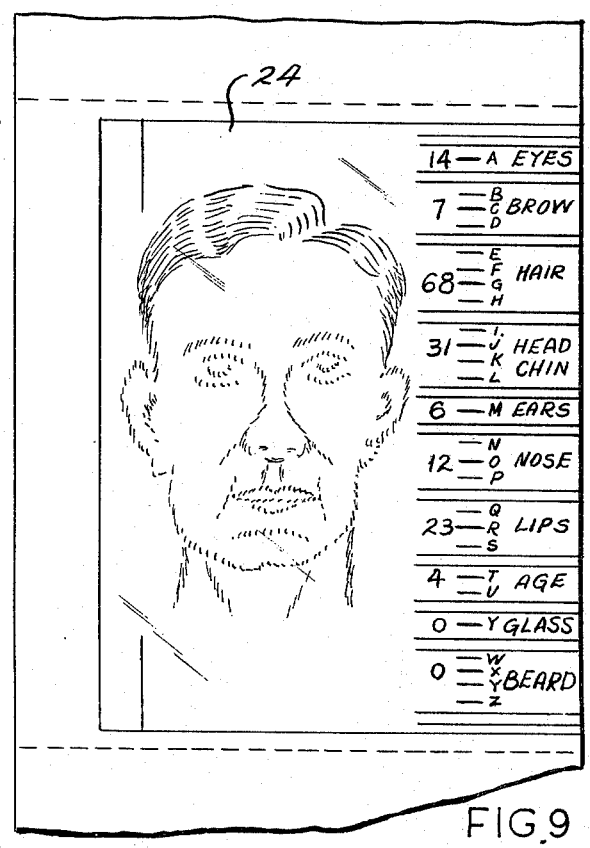
FIG. 9 is an elevational view of the window and a composite portrait formed by properly registered frames of the film strips as viewed through the window.

For example, if the witness selects hair designated by the numeral 68 on the chart C, the operator places the lens 26 of the apparatus A to his eye and determines whether the frame 68 for hair is on the spool 66 of the upper spool assembly 50$d$ or lower spool assembly 52$d$. He then presses the proper spool 66 inwardly and advances the film strip 110$d$ in the proper direction by burning the hand knob 102. The advancement continues until the registration mark $m$ opposite the numeral 68 on the film strip 110$d$ aligns with the registration mark $n$ opposite the letter G in the zone $o$ designated "hair" on the window 24. The same procedure is repeated with respect to the other film strips 110. This produces a composite portrait (FIG. 9).

The witness is then given an opportunity to look through the lens 26 and observe the composite portrait. Most likely, the witness will indicate that some feature is not correct or is too high or too low. The officer will thereupon change that feature or reposition it. After several changes the witness may indicate that the composite portrait represents a suitable likeness of the criminal.

This portrait is disseminated by radio or telephone to other officers, who have the apparatus A, by calling out matching letters and numerals along the right side of the composite. For example, the correct eye frame may be designated as A-46; the correct brow frame as C-28; the correct hair frame as G-68, etc. Since the letter A is only assigned to the film strip 110$g$ for eyes, the officer disseminating the portrait need not specifically call out "eyes". The same is true of the other facial features.

The dissemination will most likely occur by radio and the officer receiving the letters and numerals will write them. Thereafter, those officers dial the information into their apparatus A aligning the registration marks $m$ and $n$ which were disseminated. Thus, the officers in the field likewise have a portrait of the criminal.

It should be noted that once a frame is precisely aligned with its registration mark $n$ on the window 24 it will remain in that position within the gate 32 due to the friction between the contacting tapered surfaces of the tapered braking portions 70 on the spools 66 and the tapered sockets 60. When the spools 66 are so positioned the pulleys 80 for those spools 66 merely rotate without driving the spools 66, since the tapered surfaces of the clutch rings 78 are separated slightly from the pulleys 80. However, the friction between a tapered braking portion 70 and its socket 60 is not so great as to prevent the spool 66 associated therewith from rotating as the film strip 110 pays off of it.

Since all of the film strips 110 enter the gate 32 at relative small angles, substantial kinks in the film strips 110 are avoided. Hence, the film strips 110 will pass easily through the gate 32, even after the apparatus A has not been used for an extended period of time.

While the illustrative apparatus A has been described in conjunction with composing portraits, it may be used to compose other types of composite illustrations. For example, it may be used to put relatively simple geometric figures together into more complex geometric figures, the simple ones of course being on the film strips and the more complex being the composite. Likewise, it may be used by architects and designers to provide a quick visualization of concepts. In this type of device building outlines may be on one film strips, windows on another, doors on still another, and the like.

This invention is intended to cover all changes and modifications of the example of the invention herein chosen for purposes of the disclosure which do not constitute departures from the spirit and scope of the invention.

What is claimed is:

1. An apparatus for composing composite illustrations, said apparatus comprising: a case having a viewing aperture therein; means forming a gate within the case, the gate being located such that one side thereof is visible from the viewing aperture; means for causing the other side of the gate to be illuminated; a plurality of first spools located within the case beyond the gate; a plurality of film strips passing through the gate with the film strips being superimposed within the gate, each film strip being wound around a different first spool beyond the gate; first driving wheels in the case, there being a separate first driving wheel associated with each first spool, each first driving wheel being normally disengaged from and rotatable with respect to its first spool, each first driving wheel further being engageable independently of the others with its first spool so that each first driving wheel and its first spool will rotate together; drive means for rotating all of the first driving wheels in unison; and clutch means associated with each first spool and its first driving wheel for engaging the spools with their respective wheels on a selective basis to rotate a selected first spool and move the film strip thereon through the gate, thus changing the composition of the composite illustration formed in the gate.

2. An apparatus according to claim 1 wherein the first spools are located beyond one end of the gate; wherein a plurality of second spools are located in the case beyond the other end of the gate; wherein each film strip is wound around a different second spool so that the different film strips are carried on different sets of corresponding first and second spools; wherein second driving wheels are in the case, there being a separate second driving wheel associated with each second spool, each second driving wheel being normally disengaged from and rotatable with respect to its second spool, each second driving wheel further being engageable independently of the other second driving wheels with its second spool so that the second driving wheel and its second spool will rotate together; wherein the drive means also rotates all of the second driving wheels in unison and in unison with the first driving wheels; and wherein clutch means are also associated with each second spool and its second driving wheel for engaging the second spools with their respective second driving wheels on a selective basis to rotate a selected second spool and move the film strip thereon in the opposite direction from which the film strip is moved by its first spool.

3. An apparatus according to claim 2 wherein said one side of the film gate is a transparent member and the other side is a light transmitting member which is illuminated by said means for causing the other side of the film gate to be illuminated.

4. An apparatus according to claim 2 wherein the means defining the gate includes a transparent window on said one side of the gate, the window having registration marks thereon; and wherein the film strips at each illustration thereon have registration marks which will align with the registration marks on the window.

5. An apparatus according to claim 4 wherein the window has a registration mark for each film strip; and wherein the frame of a film strip is properly positioned in the gate when the registration mark of that frame aligns with that registration mark on the window which is for the specific film strip of which the frame forms a part.

6. An apparatus according to claim 5 wherein the window has several registration marks for at least some of the film strips so that frames of those film strips may assume several proper positions within the gate.

7. An apparatus according to claim 5 wherein the frames of each film strip illustrate different variations of a particular facial feature.

8. An apparatus according to claim 2 wherein the clutch means comprises opposed surfaces on the wheel and spool, bearing means for supporting the spool and enabling the spool and wheel to rotate about a common axis and for further permitting relative axial movement between the spool and wheel of sufficient magnitude to enable the opposed surfaces to contact each other, and a spring urging the opposed surfaces on the wheel and spool apart.

9. An apparatus according to claim 8 wherein the opposed surfaces of each spool and its driving wheel are frictionally engaged so that no positive connection exists between the spool and its driving wheel.

10. An apparatus according to claim 8 wherein the opposed surfaces are tapered.

11. An apparatus according to claim 8 and further comprising brake means for impeding rotation of the spool when the spring urges the opposed surfaces apart.

12. An apparatus according to claim 2 wherein the means for rotating the first and second driving wheels in unison comprises: a rotatable shaft, a hand knob on the shaft, a pulley on the shaft, and an endless cable trained over the pulley and all of the driving wheels.

13. An apparatus for composing composite illustrations, said apparatus comprising: a case having a viewing aperture therein; means defining a gate within the case and including a transparent window at one side of the gate; a plurality of film strips extended through the gate with the film strips being superimposed in gate so that when properly aligned they will form a composite illustration which is visible through the window, and means for advancing the film strips individually so as to alter the composition of the composite iIllustration, the window having a plurality of registration marks thereon, the window registration marks being assigned different designations and being arranged in succession in the direction of movement for the film strips through the gate, there being at least one separate window registration mark for each film strip, each frame of each film strip being assigned a separate number which appears thereon and having a registration mark thereon which then positioned properly with respect to the window registration mark for the particular film strip of which the frame forms a part, properly positions the frame within the gate, whereby a correctly proportioned composite illustration is formed which may be identified by the window designation and frame numbers of aligned registration marks on the window and frames.

14. An apparatus according to claim 13 wherein the window registration marks are arranged in succession near a margin of the window.

15. An apparatus according to claim 13 wherein the window registration marks are designated by letters.

16. An apparatus according to claim 13 wherein there are several registration marks for at least some of the film strips, those registration marks being arranged in succession in the direction which the film strips move, whereby the frames of those film strips may be positioned at several locations in the gate.

17. An apparatus according to claim 13 wherein the frames on the film strips are designated by numerals and the registration marks on the window are designated by letters of the alphabet.

18. An apparatus according to claim 13 wherein the window has several registration marks for at least some of the film strips so that the frames on those film strips may assume several proper positions within the gate, each of which will result in a slightly different composite illustration.

19. An apparatus according to claim 13 wherein the means for advancing the film strips comprises: first spools located beyond one end of the gate with each first spool having a separate film strip wound around it, second spools located beyond the other end of the gate with each second spool likewise having a different film strip wound around it so that one end of every film strip is wound around one of the first spools and the other end is wound around one of the second spools, and means for rotating the spools selectively such that the film strip associated with that spool will wind further around it and hence advance through the gate.

20. An apparatus according to claim 19 wherein the means for rotating the spools comprises a spool pulley at one end of each spool and normally rotatable independently of the spool about the axis of rotation for the spool, the pulley and spool having opposed friction surfaces, spring means for urging the friction surfaces apart, a drive pulley in the case, and an endless cable trained over the drive pulley and spool pulleys so that when the drive pulley rotates the spool pulleys will all rotate in unison; and wherein each spool is shiftable axially against the force exerted thereon by its spring means to urge the opposed friction surfaces for that spool and the spool pulley associated therewith together so that the spool rotates with the spool pulley.

21. An apparatus according to claim 20 wherein the spool carries a braking surface which is urged against a fixed surface on the case by the spring means when the friction surfaces of the spool and spool pulley are separated.

22. An apparatus according to claim 19 wherein the spools are positioned such that the angle between the gate and the portion of any film strip immediately beyond the gate does not exceed about 30°.

* * * * *